(12) United States Patent
Gill et al.

(10) Patent No.: US 7,209,329 B2
(45) Date of Patent: Apr. 24, 2007

(54) HEAT SINK AND HIGH THERMAL STABILITY STRUCTURE FOR CPP SENSOR

(75) Inventors: Hardayal Singh Gill, Palo Alto, CA (US); Wen-Chien Hsiao, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 401 days.

(21) Appl. No.: 10/878,821

(22) Filed: Jun. 28, 2004

(65) Prior Publication Data
US 2005/0286178 A1    Dec. 29, 2005

(51) Int. Cl.
*G11B 5/33* (2006.01)
*G11B 5/127* (2006.01)
(52) U.S. Cl. .................... 360/324.2; 360/320
(58) Field of Classification Search ............. 360/324.2, 360/320
See application file for complete search history.

(56) References Cited

U.S. PATENT DOCUMENTS

| 5,739,990 | A | 4/1998 | Ravipati et al. ............ 360/113 |
| 5,903,708 | A | 5/1999 | Kano et al. ............... 388/32 R |
| 5,965,840 | A | 10/1999 | Nagarajan et al. .......... 136/203 |
| 6,141,190 | A | 10/2000 | Nakamoto et al. .......... 360/324 |
| 6,636,395 | B1 | 10/2003 | Terunuma ............... 360/324.11 |
| 6,754,055 | B2 * | 6/2004 | Ono et al. ............. 360/324.12 |
| 2002/0154451 | A1 * | 10/2002 | Dimitrov et al. ........... 360/317 |
| 2002/0154456 | A1 | 10/2002 | Carey et al. ............ 360/324.11 |

* cited by examiner

*Primary Examiner*—Brian E. Miller
(74) *Attorney, Agent, or Firm*—Zilka-Kotab, PC

(57) ABSTRACT

A currently perpendicular to plane (CPP) sensor having a heat sink structure disposed beyond the stripe height of the sensor. The heat sink is preferably in thermal contact with one of the shields/leads of the sensor while being electrically insulated from the other shield/lead.

20 Claims, 5 Drawing Sheets

HEAT SINK AND HIGH THERMAL STABILITY STRUCTURE FOR CPP SENSOR

FIELD OF THE INVENTION

The present invention relates to giant magnetoresistive (GMR) sensors and more particularly to a current perpendicular to plane (CPP) sensor having a heat sink structure located behind the stripe height.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

In an attempt to reduce sensor height, and thereby reduce bit length, researchers have recently been developing self pinned sensors. The pinned layer of a self pinned sensor achieves pinning by taking advantage of the high positive magnetostriction of certain magnetic materials. Sensors inevitably contain compressive stresses. By constructing an antiparallel pinned structure of such positive magnetostriction materials, these compressive stresses can be used to generate a strong magnetic anisotropy in the pinned layers. This anisotropy provides the pinning allowing the sensor to be built without an AFM layer. Since AFM layers are very thick relative to the other layers of the sensor, this leads to a significant reduction of sensor height.

In another attempt to increase sensor performance, researchers have developed dual GMR sensors. Such sensors include two free layers sharing a common pinned layer, or may include two pinned layers sharing a common free layer. Such devices have the potential to substantially increase GMR effect by doubling the number of spacer layers and the amount of spin dependent scattering.

In further attempts to increase data rate and data density, researchers have been focusing on the use of perpendicular recording. Conventional magnetic storage systems have recorded bits of data as magnetic transitions oriented longitudinally on the magnetic medium. As the name suggests, a perpendicular system records bits of data as magnetic transitions oriented perpendicular to the magnetic medium. The system employs a magnetic medium having a high coercivity top layer and a magnetically softer underlayer. The perpendicular recording system also employs a magnetic write element having a write pole with a small cross section and a return pole having a much larger cross section. Magnetic field from the write pole emits as a highly concentrated magnetic field oriented perpendicular to the surface of the medium. This concentrated field is sufficiently high to overcome the high coercivity of the upper layer of the magnetic medium and thereby write a magnetic transition thereon. The resulting flux in the medium then travels through the soft under layer, where it returns to the return pole in a more spread out pattern having insufficient strength to erase the signal from the high coercivity top layer.

Sensors can be categorized as current in plane (CIP), sensors wherein current flows through the sensor in a direction parallel with the plane of the layers making up the sensor (ie. side to side), or as current perpendicular to plane (CPP) sensors, wherein current flows perpendicular to the planes of the layers making up the sensor, (ie. from top to bottom). Sensors have traditionally been constructed as CIP sensors, however, the increased focus on perpendicular recording has lead to an increased interest in CPP sensors. This is because CPP sensors are more suited to use in perpendicular recording systems than are CIP sensors.

As can be seen, there has been much effort expended in developing recording systems that can provide ever increasing data rate and data density. Regardless of the scheme used to produce such advances, one overriding factor remains. In order to increase data rate and data density, magnetoresistive read elements must be constructed ever smaller. The smaller read elements must tolerate ever larger concentrations of electrical current which leads to ever increasing heat buildup in the sensor. The heat generated from the sense current then, becomes a limiting factor in increasing sensor performance and reducing sensor size, regardless of the advances made in other areas of design.

Therefore, there remains a strong felt need for a means for minimizing the heat build-up in a magnetoresistive sensor. Such a mechanism for reducing heat would preferably be suitable for use in a CPP sensor, since these sensors are of most interest in future perpendicular recording systems.

SUMMARY OF THE INVENTION

The present invention provides a current perpendicular to plane (CPP) giant magnetoresistive (GMR) sensor having improved thermal conduction. The sensor includes a magnetoresistive element having a top surface, a bottom surface, an air bearing surface, a stripe height surface opposite the air bearing surface and first and second laterally opposed sides. First and second electrically conductive leads contact the top surface and the bottom surface respectively. An insulation layer coats the stripe height surface of the sensor and the top of the second lead, and a layer of high thermal conductivity material is disposed between the first and second leads, contacting the first lead.

The high conductivity material, which may be Cu, advantageously conducts heat away from the magnetoresistive element. Since the lead, which is preferably a thermal conductive material, contacts the magnetoresistive element, heat will be readily conducted away from the sensor and into the thermally conductive layer disposed between the leads, which acts as a heat sink.

The sensor may also include first and second hard bias layers formed adjacent the first and second laterally opposed sides of the sensor element. In addition to coating the second shield and the stripe height surface of the sensor, the insulation layer can also be formed on the first and second laterally opposed side walls to separate the sensor element from the bias layers an avoid current shunting through the bias layers.

To further increase thermal conduction away from the sensor element, the first shield may be formed of two parts, the first being a pedestal formed over and contacting the top surface of the sensor element. The second or main piece of the second lead can then be formed on top of the pedestal piece and can then extend back in the stripe height direction beyond the stripe height of the sensor. In such a construction, the thermally conductive layer can maintain physical contact with both a back surface of the pedestal portion and a portion of a bottom surface of the second or main portion of the first lead.

It should be appreciated that the heat sink design of the present invention can be used with virtually any type of CPP sensor, including: a self pinned sensor; an AFM pinned sensor; a dual GMR sensor having two free layers sharing a common pinned layer; a dual GMR sensor having two pinned layers sharing a common free layer; or any other type of CPP sensor.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
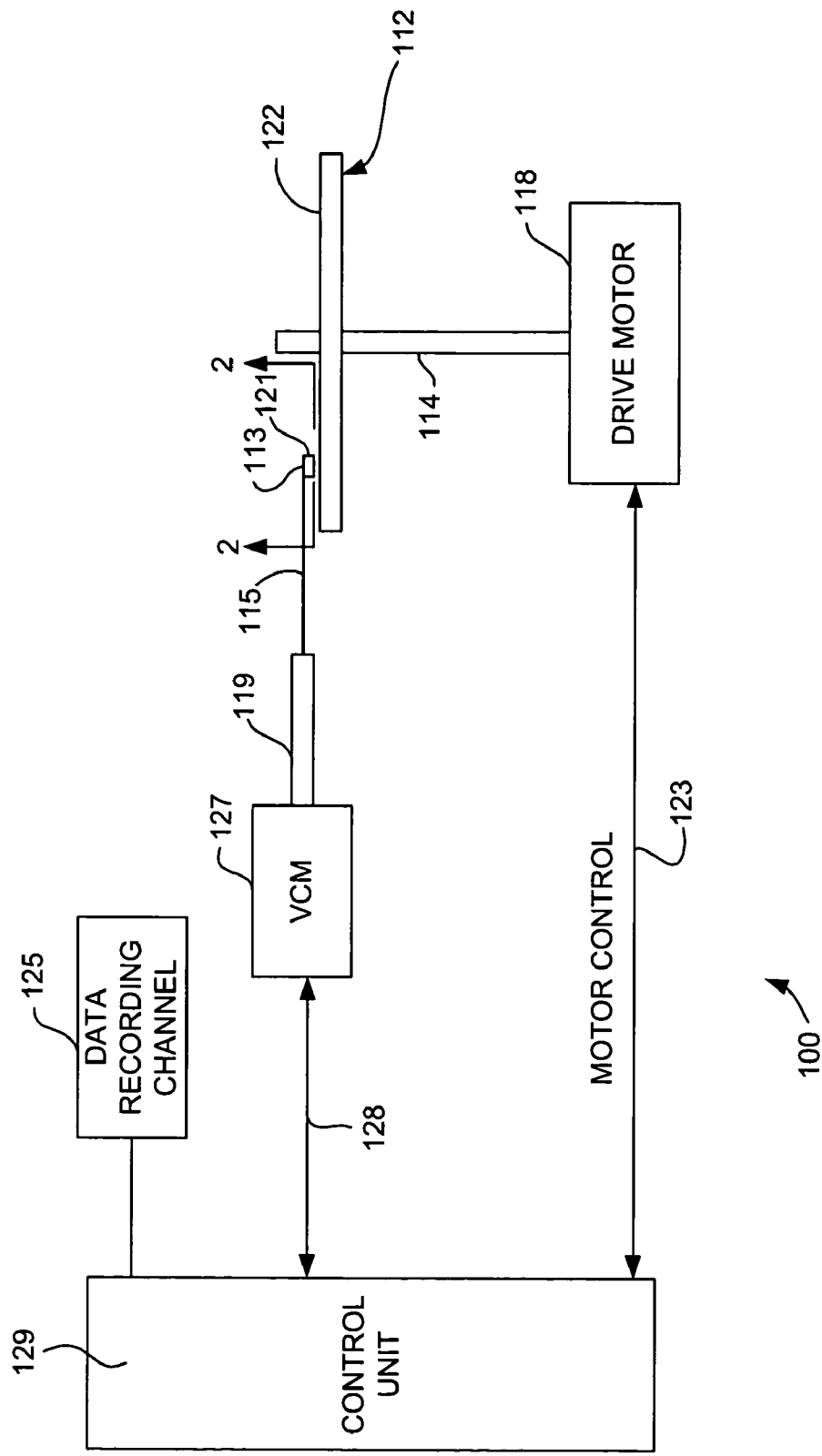
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
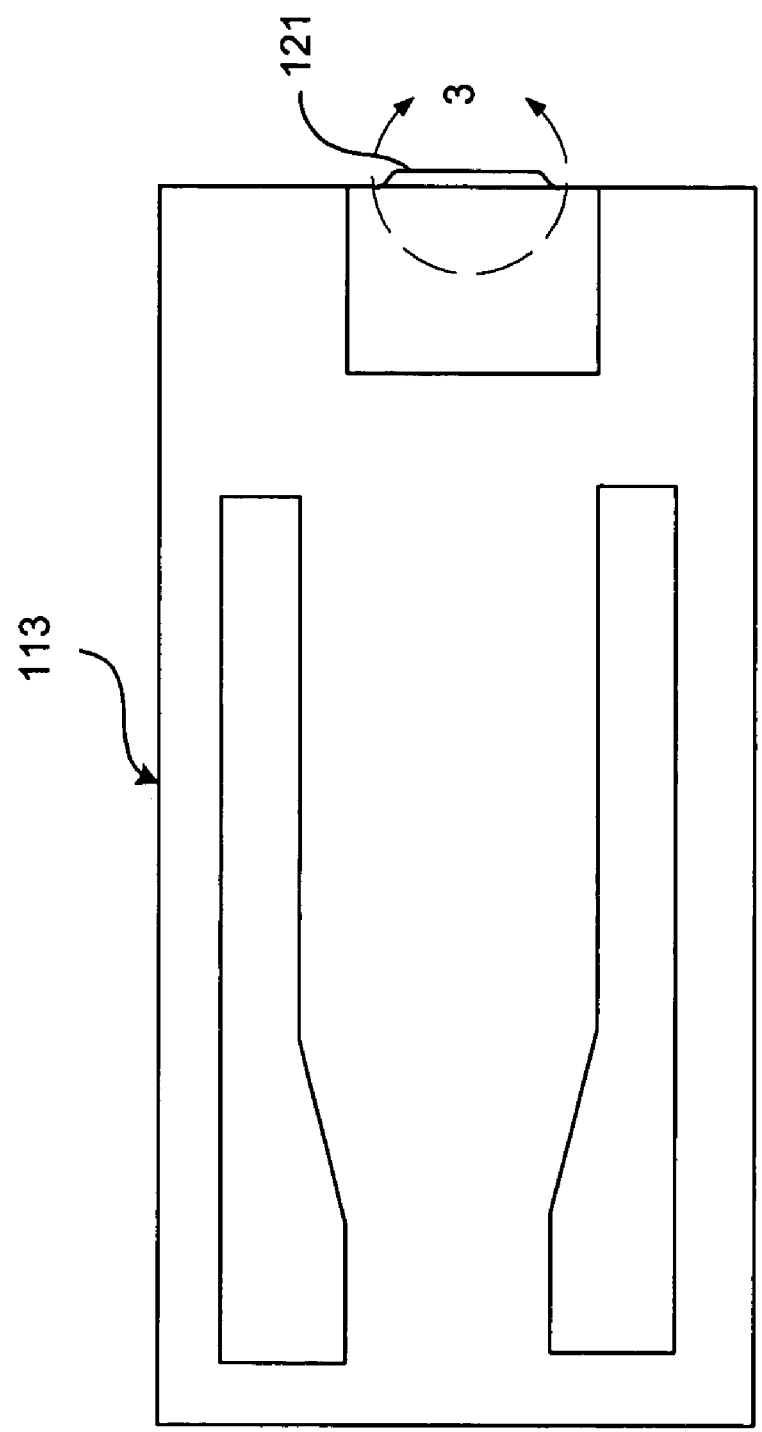
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
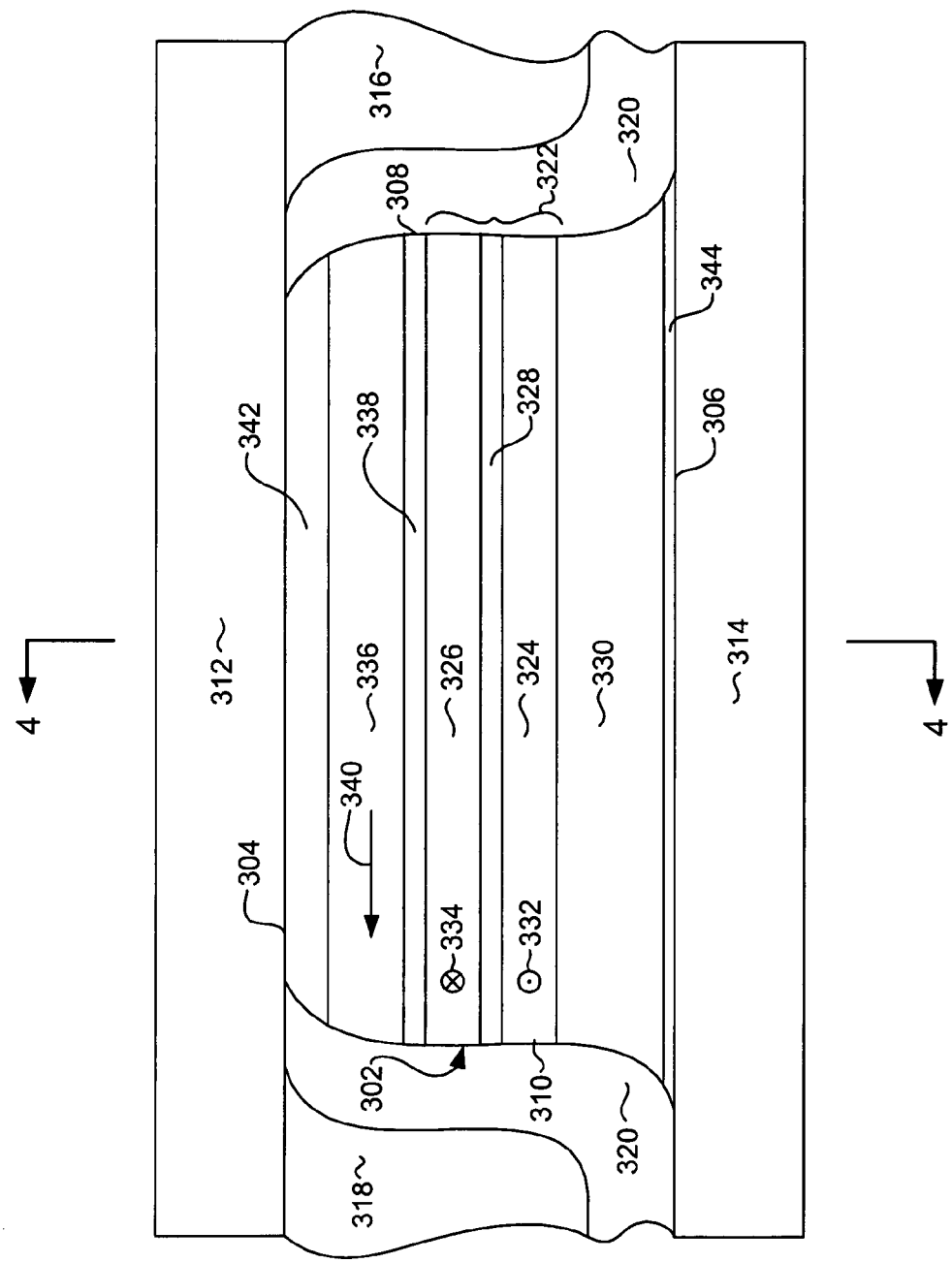
FIG. 3 is an ABS view of a magnetic sensor according to an embodiment of the present invention taken from circle 3 of FIG. 2.

With reference now to FIG. 3, a magnetoresistive sensor 300 according to an embodiment of the invention includes a magnetoresistive sensor element or sensor stack 302. The sensor element 302 has a top surface 304, bottom surface 306, and first and second laterally opposed side surfaces 308, 310. A fist electrically conductive lead layer 312 is formed over the top surface 304 of the sensor element 302, and a second electrically conductive lead layer 314. It should be pointed out that the first and second lead layers can be constructed of a magnetic material such as NiFe so that they can also function as magnetic shields. First and second hard bias layers 316, 318 constructed of a hard magnetic (high coercivity) material such as, for example, CoPtCr are formed adjacent the first and second sides 308, 310 of the sensor element 302. A layer of insulation 320 covers the sides 308, 310 of the sensor as well as the second shield 314, separating the hard bias layers 316, 318 from the sensor element 302 and from the second shield 314. This insulation layer 320 prevents current from being shunted through the bias layers 316, 318 from one lead 312 to the other 314.

As discussed above in the Summary of the Invention, the sensor element can be virtually any type of CPP GMR sensor. For purposes of illustration only, the sensor will be described herein as a single, AFM pinned, AP pinned GMR sensor. With continued reference now to FIG. 3, the sensor element 302 includes a pinned layer structure 322, including first and second antiparallel ferromagnetic layers 324, 326 that are antiparallel coupled across an antiparallel (AP) coupling layer 328. The second magnetic layer 324 of the pinned layer structure 322 is exchange coupled with a layer of antiferromagnetic AFM material 330, which can be for example CoPt, or IrMnCr or some other antiferromagnetic material. The ferromagnetic layers 324, 326 of the pinned layer structure 322 have magnetic moments 332, 334 that are pinned in antiparallel directions perpendicular with the air bearing surface ABS, as can be seen more clearly with reference to FIG. 4.

With continued reference to FIG. 3, the sensor element 302 further includes a magnetic free layer 336 that is separated from the pinned layer structure 322 by a non-magnetic, electrically conductive spacer layer 338, such as Cu or some other material. The free layer 336 can be constructed of several materials including Co, CoFe, NiFe or combinations thereof. The free layer 336 has a magnetic moment 340 that is biased in a direction that is parallel with the ABS. Biasing is provided by the hard magnetic bias structures 316, 318, and although the moment 336 is biased it is free to rotate in the presence of a magnetic field, such as from a magnetic medium. A capping layer 342, such as Ta may be provided at the top of the sensor element 302 to protect the sensor from damage during manufacturing processes such as annealing. In addition, the sensor element may include a seed layer 344 at its bottom to initiate a desired crystalline structure in the other subsequently deposited layers 322–342 of the sensor element.

Figure 4:
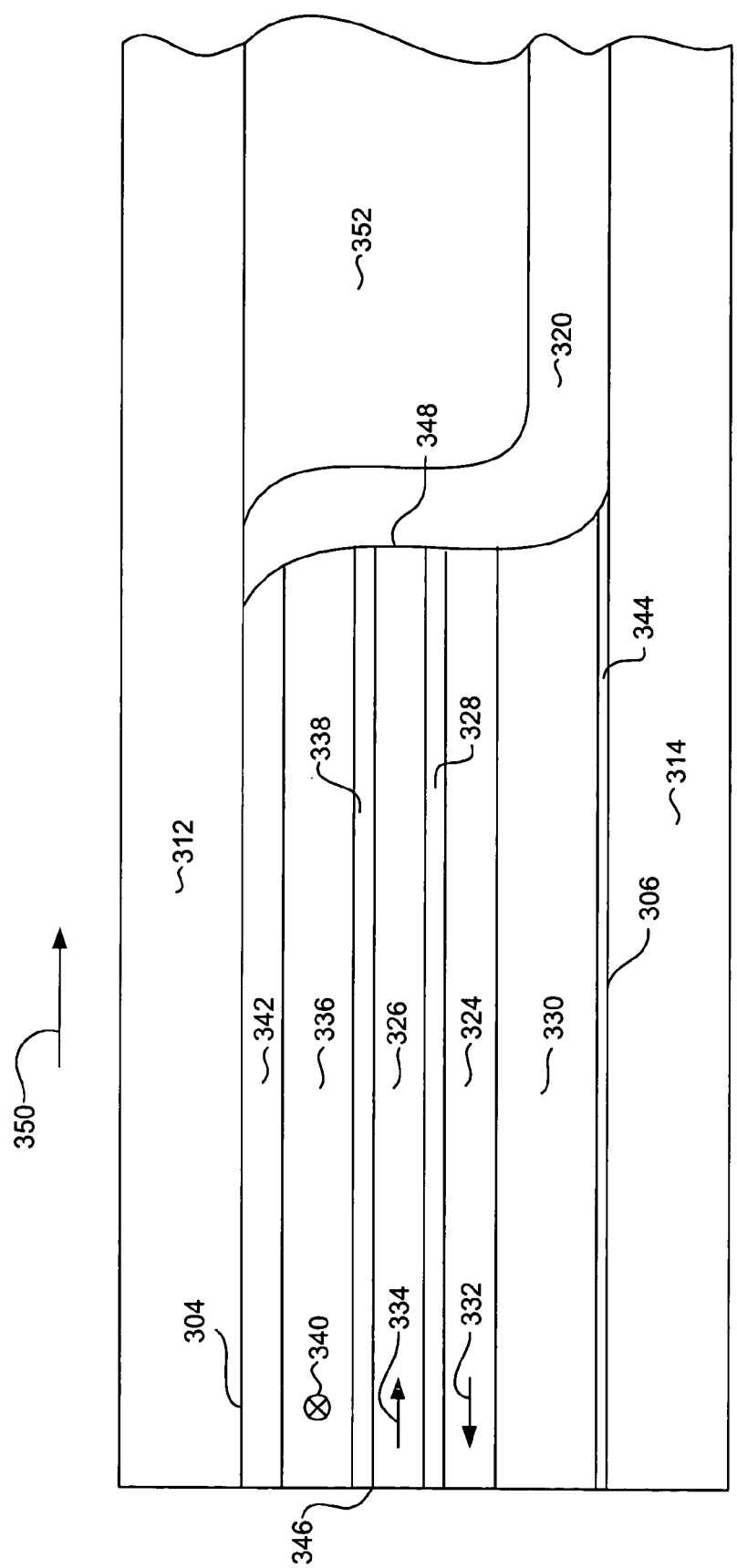
FIG. 4 is a side, sectional view taken from line 4—4 of FIG. 3.

With reference now to FIG. 4, the sensor element has an airbearing surface (ABS) 346 intended for facing a magnetic medium (not shown) and a stripe height surface 348 opposite the ABS 346. For purposes of discussion, the direction away from the ABS will be called the stripe height direction 350 and extends beyond the stripe height surface 348.

As can be seen with reference to FIG. 4, the first and second leads 312, 314, extend back in the stripe height direction 350 beyond the stripe height surface 348 of the sensor element 302. In addition it can be seen that the insulation layer 320 wraps around the back of the sensor element 302 to coat the sensor stripe height surface 348 as well as the upper surface of the second shield 314. The insulation layer is preferably deposited by a conformal deposition technique, resulting in a thickness on the stripe height surface 348 that is substantially similar to the thickness over the second lead 314. The insulation layer is preferably 25 to 75 Angstroms thick, and can be constructed of, for example, $Al_2O_3$.

With continued reference to FIG. 4, the sensor 300 includes a layer of highly thermally conductive material 352 that extends from the insulation layer 320 covering the stripe height surface 348 to a distal location in the stripe height direction 350. The thermally conductive layer is preferably Cu and is sandwiched between the insulation layer 320 and the first shield 312, contacting and being thermally connected with the first shield 312.

It will be appreciated that when heat is generated in the sensor element 302, such as by the conduction of sense current through the sensor 302, that heat will be dissipated by conduction through the first lead 312. This heat will then be further conducted into the thermally conductive layer 352 which is in contacted with and thermally connected with the lead 312. This thermally conductive layer forms an excellent heat sink which can dissipate large amounts of heat from the sensor element 302.

Figure 5:
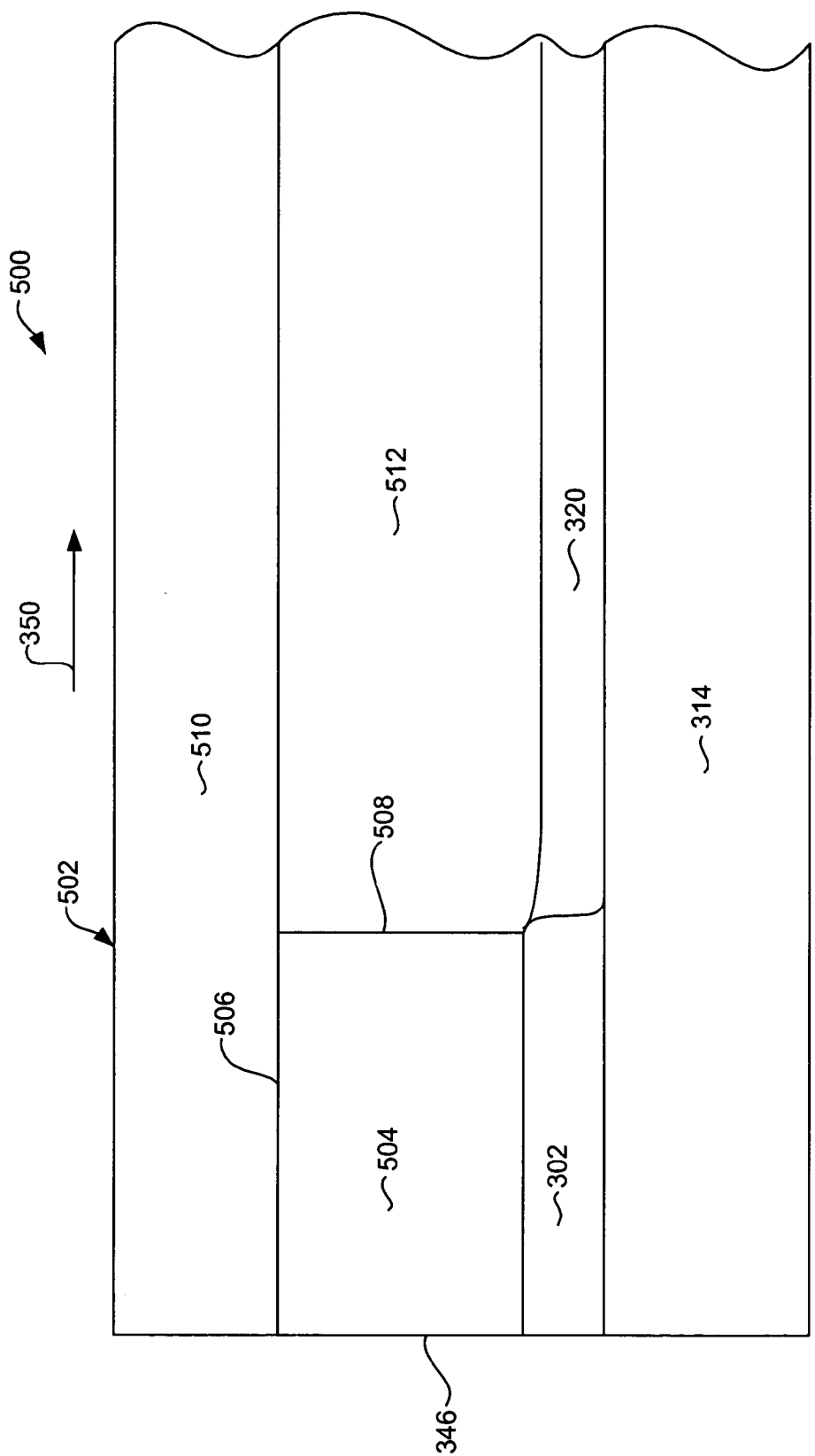
FIG. 5 is a side, sectional view, of an alternate embodiment of the invention.

With reference now to FIG. 5, magnetic sensor 500 according to an alternate embodiment of the invention includes a two part first lead structure 502. For purposes of clarity the various layers 322–342 of the sensor element 302 have been omitted from FIG. 5. The two part first lead structure 502 includes a pedestal portion 504 formed essentially directly over the sensor 302, the pedestal portion having a top surface 506 and a back surface 508 formed opposite the ABS 346. The first lead 502 also includes a second, main portion 510 that is formed over and contacts the top surface 506 first pedestal portion 504, and extends beyond the back surface 508 of the pedestal portion 504 to a distal location in the stripe height direction 350.

In the presently described embodiment, the insulation layer 320, extends from the top of the sensor 302, to a distal location in the stripe height direction 350. The insulation layer 320 preferably has a thickness less than or equal to the thickness of the sensor element, and preferably has a thickness of 25 to 75 Angstroms.

With continued reference to FIG. 5, a thermally conductive layer 512 is formed over the insulation layer 320, contacting and being thermally connected with the main portion 510 of the first lead structure as well as the back surface 508 of the pedestal portion 504. The thermally conductive layer 512 can be constructed of Cu, and extends from the pedestal structure 504 to a distal location in the stripe height direction 350.

It will be appreciated that the embodiment described with reference to FIG. 5, requires slightly more manufacturing steps than that of FIGS. 3, and 4. However, it will also be appreciated that the embodiment described with reference to FIG. 5 provides a much larger heat sink in the form of a much thicker thermally conductive layer 512 than is possible with the embodiment of FIG. 4. In addition, it will be appreciated that there is more surface area contact between the lead 502, and the thermally conductive layer, since the thermally conductive layer contacts the back surface 508 of the pedestal 504 as well as the main part 510 of the lead 502. This provides a larger path for the flow of heat from the lead 502 to the thermally conductive layer 512. The presently described embodiment, might therefore become attractive when design requirements dictate the removal of a larger amount of heat from the sensor element 302 than is possible with the embodiment described with reference to FIG. 4.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A current perpendicular to plane (CPP) magnetoresistive sensor, comprising:
    magnetoresistive sensor element having a top surface and a bottom surface opposite the top surface, having laterally opposed first and second sides, and having an air bearing surface and a stripe height end surface opposite the air bearing surface;
    a first electrically conductive lead layer contacting the top surface of the magnetoresistive sensor element;
    a second magnetically conductive lead layer contacting the bottom surface of the magnetoresistive sensor element; and
    a layer of electrical insulation material covering the stripe height end surface of the magnetoresistive sensor and extending over the second electrically conductive lead; and
    a layer of thermally conductive material located between the insulation layer and the first lead layer.

2. The sensor as in claim 1, wherein the layer of thermally conductive layer initiates at the insulation layer formed over the stripe height surface and extends in the stripe height direction away from the sensor and away from the ABS.

3. The sensor as in claim 1 wherein the layer of thermally conductive material is also an electrically conductive material.

4. The sensor as in claim 1 wherein the layer of thermally conductive material comprises Cu.

5. The sensor as in claim 1 wherein the layer of thermally conductive material makes thermally conductive contact with the first shield layer.

6. The sensor as in claim 1 wherein the first and second leads are magnetic materials that also function as magnetic shields.

7. The sensor as in claim 1 wherein the insulation layer has a thickness of 25 to 75 Angstroms over the second lead.

8. The sensor as in claim 1 wherein the insulation layer has a thickness of 25 to 75 Angstroms over the stripe height surface.

9. The sensor as in claim 1 wherein the insulation layer comprises $Al_2O_3$.

10. The sensor as in claim 1 wherein the insulation layer has a thickness over the second lead that is about equal to a thickness over the stripe height surface.

11. The sensor as in claim 1 wherein the insulation layer also extends over the first and second laterally opposed sides of the magnetoresistive sensor element.

12. The sensor as in claim 11 wherein the insulation layer has a thickness of 25 to 75 Angstroms over the laterally opposed sides of the sensor element.

13. The sensor as in claim 11 wherein the insulation layer has thicknesses that are about equal over the lead layer, the stripe height surface and the first and second laterally opposed side surfaces.

14. The sensor as in clam 11 further comprising first and second hard bias layers formed over the insulation layer adjacent the first and second sides of the magnetoresistive sensor element and extending laterally outward from the sensor element.

15. The sensor as in claim 1 wherein the first lead further comprises:
    a pedestal portion formed over and electrically connected with the upper surface of the magnetoresistive sensor element; and
    a main portion formed over the pedestal portion, being electrically and thermally connected therewith, the main portion extending back beyond the magnetoresistive sensor element in the stripe height direction.

16. The sensor as in claim 15 wherein the thermally conductive layer contacts the pedestal portion and the main portion of the first lead.

17. The sensor as in claim 15 wherein the thermally conductive layer has a thickness of at least 1000 Angstroms.

18. The sensor as in claim 15 wherein the insulation layer has a thickness that is no greater than a thickness of the magnetoresistive sensor element as measured from the bottom surface to the top surface.

19. The sensor as in claim 1 wherein the first and second electrically conductive leads comprise NiFe.

20. A magnetic data recording system comprising:
    a magnetic medium
    a motor connected with the magnetic medium to move the magnetic medium;
    a slider;
    an actuator connected with the slider to position the slider adjacent to the magnetic medium; and
    a current perpendicular to plane (CPP) magnetoresistive sensor connected with the slider, the sensor comprising:
        a magnetoresistive sensor element having a top surface and a bottom surface opposite the top surface, having laterally opposed first and second sides, and having an air bearing surface and a stripe height end surface opposite the air bearing surface;
        a first electrically conductive lead layer contacting the top surface of the magnetoresistive sensor element;
        a second magnetically conductive lead layer contacting the bottom surface of the magnetoresistive sensor element; and a layer of electrical insulation material covering the stripe height end surface of the magnetoresistive sensor and extending over the second electrically conductive lead; and a layer of thermally conductive material located between the insulation layer and the first lead layer.

* * * * *

UNITED STATES PATENT AND TRADEMARK OFFICE
CERTIFICATE OF CORRECTION

PATENT NO.        : 7,209,329 B2
APPLICATION NO.   : 10/878821
DATED             : April 24, 2007
INVENTOR(S)       : Gill et al.

It is certified that error appears in the above-identified patent and that said Letters Patent is hereby corrected as shown below:

In claim 1, column 7, line 39, before "magnetoresistive senor", please insert --a--.

In claim 14, column 8, line 24, please replace "clam" with --claim--.

In claim 20, column 8, line 49, please insert a --,-- between "system" and "comprising".

Signed and Sealed this

Twentieth Day of July, 2010

David J. Kappos
*Director of the United States Patent and Trademark Office*